W. D. MARTIN.
REPAIR TOOL FOR PNEUMATIC TIRES.
APPLICATION FILED MAR. 20, 1917.
1,257,908.
Patented Feb. 26, 1918.
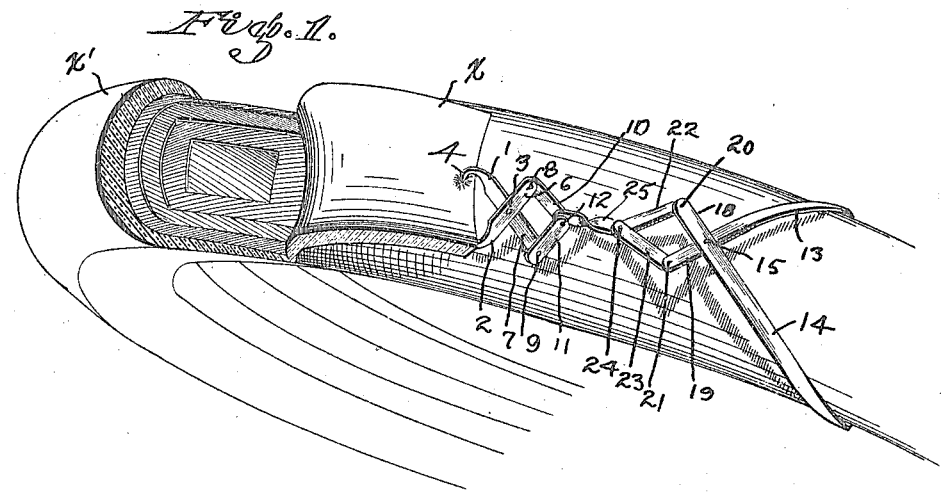
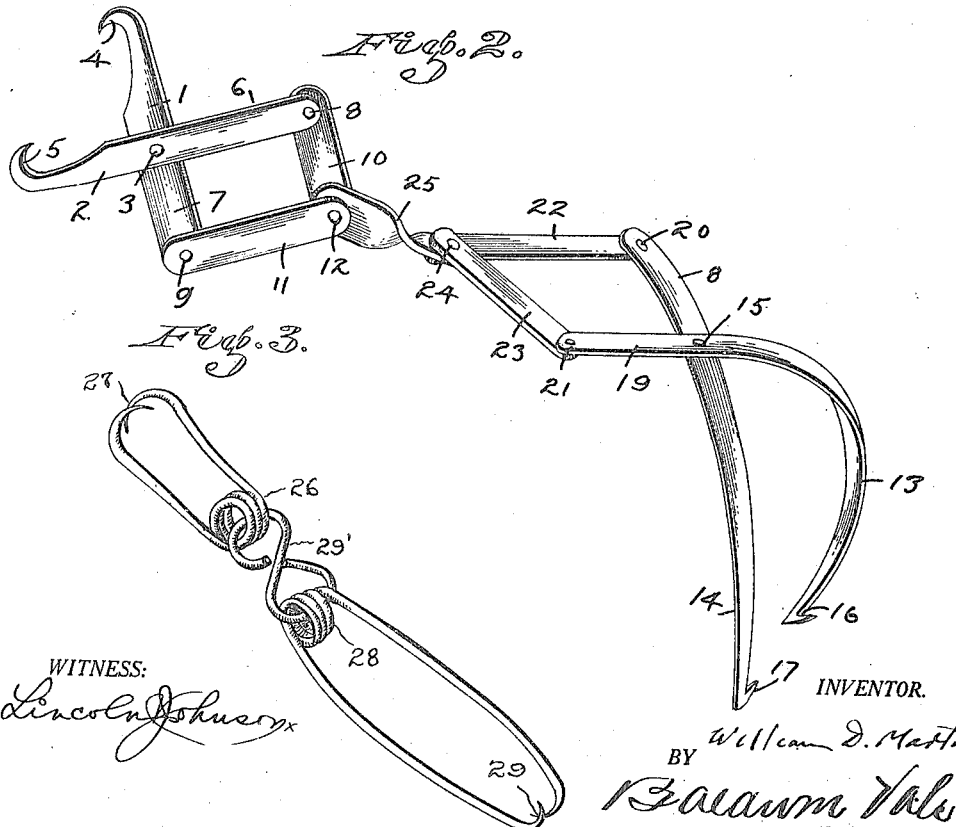
WITNESS:
Lincoln Johnson
INVENTOR.
BY William D. Martin
Balcum Vale
ATTORNEY.

UNITED STATES PATENT OFFICE.

WILLIAM D. MARTIN, OF SAN FRANCISCO, CALIFORNIA.

REPAIR-TOOL FOR PNEUMATIC TIRES.

1,257,908.  Specification of Letters Patent.  Patented Feb. 26, 1918.

Application filed March 20, 1917. Serial No. 156,185.

*To all whom it may concern:*

Be it known that I, WILLIAM D. MARTIN, a subject of Great Britain, and a resident of the city and county of San Francisco, State of California, have made a new and useful invention—to wit, Improvements in Repair-Tools for Pneumatic Tires; and I do hereby declare the following to be a full, clear, concise, and exact description of the same.

The invention relates particularly to the tool for holding the flap of the tread in making sectional repairs in pneumatic tires.

Among the objects of the invention are to hold the tread flap out of the way of the operator while making repairs on the internal carcass of the tire.

Other advantages and objects will appear as the description progresses.

In this specification and the annexed drawing, the invention is illustrated in the form considered by me to be the best, but it is to be understood that the invention is not limited to such form because it may be embodied in other forms, and it is also to be understood that in and by the claims following the description it is desired to cover the invention in whatever form it may be embodied.

In the accompanying one sheet of drawing:

Figure 1 is a perspective view of a tire device constructed in accordance with this invention applied to a pneumatic tire, diagrammatically illustrated as in the course of repair.

Fig. 2 is an enlarged detail in perspective illustrating the construction of the device.

Fig. 3 is a perspective view of a modification of my invention.

In detail the construction illustrated in the drawing includes a pair of hook like jaws 1 and 2 cross pivoted at 3 and terminated in the hooks 4 and 5 oppositely disposed and forming a tongs. The extensions 6 and 7 are pivoted at their respective ends at the points 8 and 9 to the toggle composed of the links 10 and 11, the opposite ends of which are pivoted together at 12. The enumerated parts forming a double toggle or Jacob's ladder construction, so arranged that a longitudinal pull tending to separate the pivots 3 and 12 will advance the jaws 4 and 5 toward each other.

The opposite ends of the device consist of a tongs of similar construction comprising the jaws 13 and 14 cross pivoted at 15 and suitably curved to conform to the curvature of the tire casing and terminating in the opposed ends 16 and 17 suitably pointed and barbed to penetrate and engage the carcass. The opposite ends 18 and 19 of the jaws are pivoted at their ends 20 and 21 with the toggle links 22 and 23, the opposite ends of which are pivotally joined at 24, also forming a double toggle so combined and arranged that the separation of the pivots 15 and 24 will tend to draw the jaws 16 and 17 toward each other to engage the tire carcass.

These respective tongs are joined by the link 25 pivoted at its opposite ends in the knees of the toggles on the pivots 12 and 24 between the respective links 10 and 11, and 22 and 23. The link 25 is given a half turn or twist which throws the plane of operation of the tongs at opposite ends of the device on a horizontal and vertical plane respectively, the necessity for which is best illustrated in Fig. 1 in which the jaws 4 and 5 of the tongs engage on opposite sides of the flap X of the tread, spreading in a vertical plane, while the jaws 16 and 17 engage the lateral sides of the carcass operating on a horizontal plane, for obvious reasons.

The device is operated substantially as follows: The jaws 4 and 5 are clamped into the flap X as illustrated in Fig. 1, the hook points penetrating well into the rubber tread, the jaws 13 and 14 of the tongs on the opposite end are then slid along the carcass until there is sufficient longitudinal tension on the link 25 to hold the jaws 4 and 5 and 16 and 17 in engagement with their respective parts, the links 10 and 11, and 22 and 23 exerting a tense toggle action to hold their respective jaws in operative position.

Repairs on pneumatic tire carcasses necessitated by blow-outs therethrough are accomplished in substantially the following manner: An incision is made through the tire $X^1$ extending from near the bead to the opposite side of the carcass and through the tread of the tire to the first layer of canvas, then lateral incisions are made through the first layer of canvas parallel with the beads of the tire, to form a flap X, six inches to a foot in length according to the injury to the carcass to be repaired.. The canvas carcass is thus exposed and the repair is made in the usual manner diagrammatically illustrated in Fig. 1. In the meantime, the flap X because of its tough and resilient nature and its tendency to return to its normal position, is a serious handicap to the operator, to overcome which various expedients have been resorted to, all more or less unsuccessful and cumbersome. With the present device the flap is held back out of the way of the operator as illustrated in Fig. 1 by the natural tension of the flap, and the structure of the device is such that the greater the tension the tighter the hold.

A modification of the construction is illustrated in Fig. 3 in which spring jaws are substituted for the toggle jaws previously described. This modification is preferably composed of spring wire bent in a spiral as at 26, the opposite ends being turned in and pointed toward each other to form the hook jaws 27—27. A similar spring tongs form for the opposite end comprises the spiral 28, the opposite ends being sharpened and turned inward at 29 to form jaws to engage the carcass similar to the jaws 16 and 17. These two clamps or tongs being joined by the link 29. The modification is applied and operated similar to the toggle construction described.

Having thus described this invention, what I claim and desire to secure by Letters Patent is:

1. A tool such as disclosed including a tongs constructed and arranged to grip a tread strip cut in the tire, and engaging means connecting with the tongs for engaging the tire to enable said tongs to hold said strip away from the cut portion of the tire.

2. A tool such as described including a plurality of oppositely opening tongs joined together.

3. A tool such as described including a plurality of oppositely opening tongs linked together, said tongs opening on different planes.

4. A tool such as described including a pair of pivoted tong jaws; a pair of toggle links pivoted to said jaws and to each other; and means for attaching said tongs to a tire.

5. A tool including a tongs having cross pivoted jaws; a pair of toggle links pivoted to said jaws; and attaching means pivoted to the knee of said toggle.

6. A tool such as described including a tongs having cross pivotal jaws; a pair of toggle links pivoted to said jaws; a second tongs similarly constructed; and a link joining the respective toggles.

7. A tool such as described, including a plurality of oppositely disposed tongs having cross pivoted jaws; a plurality of pairs of toggles pivoted to said jaws respectively; and a link pivoted to the knees of said toggles.

8. A tool such as described including a tongs having cross pivoted jaws; a pair of toggle links pivoted to said jaws; a second tongs opening at an angle to said first tongs, and having laterally curved jaws adapted to engage the sides of a tire casing; a pair of toggle links pivoted to the jaws of said second tongs; and a link joining the knees of said toggles.

9. A tool such as disclosed including a gripping means for gripping a tread strip cut in the tire, and engaging means connecting with said gripping means for engaging the tire to enable said gripping means to hold said strip away from the cut portion of the tire.

In testimony whereof I have hereunto set my hand at San Francisco, California, this 27th day of February, 1917.

WILLIAM D. MARTIN.

In presence of—
BALDWIN VALE,
A. J. HENRY.